(12) United States Patent
Wang

(10) Patent No.: US 12,521,834 B1
(45) Date of Patent: Jan. 13, 2026

(54) ADJUSTABLE SPEED BELT-DISC SANDER

(71) Applicant: Duro Industries, LLC, Dover, DE (US)

(72) Inventor: Haiquan Wang, Qingdao (CN)

(73) Assignee: Duro Industries, LLC, Dover, DE (US)

( * ) Notice: Subject to any disclaimer, the term of this patent is extended or adjusted under 35 U.S.C. 154(b) by 0 days.

(21) Appl. No.: 18/908,864

(22) Filed: Oct. 8, 2024

(51) Int. Cl.
*B24B 21/20* (2006.01)
*B24B 21/04* (2006.01)

(52) U.S. Cl.
CPC .............. *B24B 21/20* (2013.01); *B24B 21/04* (2013.01)

(58) Field of Classification Search
CPC ....... B24B 23/06; B24B 21/006; B24B 21/04; B24B 21/06; B24B 21/10; B24B 21/12; B24B 21/14; B24B 21/16; B24B 21/165; B24B 21/20; F16H 55/56; F16H 9/12; F16H 9/14
See application file for complete search history.

(56) References Cited

U.S. PATENT DOCUMENTS

| | | | | |
|---|---|---|---|---|
| 2,459,969 A | * | 1/1949 | Schweickart | F16H 9/26 475/182 |
| 2,767,591 A | * | 10/1956 | Schweickart | F16H 9/16 474/35 |
| 2,893,253 A | * | 7/1959 | Beemer | F16H 55/56 474/37 |
| 2,986,353 A | * | 5/1961 | Mccoy | B65H 59/382 242/907 |
| 3,082,580 A | | 3/1963 | Lonaberger | |
| 3,114,271 A | * | 12/1963 | Davis | F16H 55/56 474/46 |
| 3,118,313 A | * | 1/1964 | Carroll | F26B 13/12 474/42 |
| 3,282,524 A | * | 11/1966 | Couzens | B65H 19/2246 242/532.2 |
| 3,604,280 A | * | 9/1971 | Davis | F16H 55/563 474/46 |
| 3,804,231 A | * | 4/1974 | Maiste | A01D 45/021 474/18 |
| 4,381,174 A | * | 4/1983 | Obler | F04B 49/20 417/15 |
| 5,133,156 A | | 7/1992 | Arms et al. | |
| 5,199,220 A | * | 4/1993 | Steiner | B24B 55/08 451/65 |
| 6,776,697 B2 | * | 8/2004 | Liao | B24B 49/006 451/178 |
| 2003/0232673 A1 | | 12/2003 | Liao et al. | |
| 2012/0238189 A1 | | 9/2012 | Rosani et al. | |

* cited by examiner

*Primary Examiner* — Joel D Crandall
(74) *Attorney, Agent, or Firm* — Georgiy L. Khayet

(57) ABSTRACT

A speed-adjustable belt-disc sander is provided. The speed-adjustable belt-disc sander includes an electric motor, a first pitch adjustable pulley driven by the electric motor, a second pitch adjustable pulley driven by the first pitch adjustable pulley, a v-belt connecting the first pitch adjustable pulley and the second pitch adjustable pulley, a first pulley driven by the second pitch adjustable pulley, a second pulley driven by the first pulley, a belt sander assembly driven by the second pulley, and a speed adjusting device designed to control an effective belt diameter of the second pitch adjustable pulley, thereby controlling the speed of the belt sander assembly.

20 Claims, 7 Drawing Sheets

ADJUSTABLE SPEED BELT-DISC SANDER

TECHNICAL FIELD

This disclosure relates to belt-disc sanders. Specifically, this disclosure relates to belt-disc sanders capable of adjusting a speed of a sanding belt.

BACKGROUND

Belt-disc sanders are machines commonly used for sanding, smoothing, and shaping wood, metal, or other materials. A belt-disc sander combines both a belt sander and a disc sander in one unit, providing two different types of sanding actions. The sanding disc is a round disc driven by the motor and covered with adhesive-backed sandpaper. The belt sander includes an abrasive belt looped around two pulleys, one driven by the motor and the other acting as an idler. Adjusting the speed of the abrasive belt is important to satisfy various requirements for processing different materials. Therefore, different speed options for the abrasive belt are needed.

BRIEF SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an example embodiment of the present disclosure, a speed-adjustable belt-disc sander is provided. The speed-adjustable belt-disc sander may include an electric motor, a first pitch adjustable pulley driven by the electric motor, a second pitch adjustable pulley driven by the first pitch adjustable pulley, and a v-belt connecting the first pitch adjustable pulley and the second pitch adjustable pulley. The speed-adjustable belt-disc sander may include a first pulley driven by the second pitch adjustable pulley, a second pulley driven by the first pulley, and a belt sander assembly driven by the second pulley. The speed-adjustable belt-disc sander may include a speed adjusting device designed to control an effective belt diameter of the second pitch adjustable pulley, thereby controlling a speed of the belt sander assembly.

The first pulley and the second pulley can be connected by a belt. The speed-adjustable belt-disc sander may include a base including a top surface, a first side surface, and a second side surface opposite the first side surface. The electric motor can be disposed inside the base. The first pulley, the second pulley, the first pitch adjustable pulley, and the second pitch adjustable pulley can be disposed on the first side surface. The speed adjusting device can be disposed on the second side surface. The first pitch adjustable pulley can be coaxial with a shaft of the electric motor. The first pulley can be coaxial with the second pitch adjustable pulley.

The speed-adjustable belt-disc sander may include a shaft designed to move a flange of the second pitch adjustable pulley, thereby adjusting the effective belt diameter of the second pitch adjustable pulley, with the shaft including internal threads. The speed-adjustable belt-disc sander can include a rod rotationally coupled with the speed adjusting device, the rod including external threads engaged with the internal threads of the shaft. When the rod is rotated by the speed adjusting device, the shaft is prevented from rotation around a rotational axis of the second pitch adjustable pulley and allowed to move along the rotational axis to move the flange. The speed-adjustable belt-disc sander may include a screw. The shaft may have a slot and the screw can be inserted into the slot to prevent the shaft from rotating around the rotational axis of the second pitch adjustable pulley.

The speed-adjustable belt-disc sander may include a spring disposed around a shaft of the electric motor. The first pitch adjustable pulley may include a first flange and a second flange forming a groove for accepting the v-belt. The spring can be designed to squeeze the v-belt between the first flange and the second flange and to push the first flange into the second flange, thereby adjusting a further effective belt diameter of the first pitch adjustable pulley in response to adjusting the effective belt diameter of the second pitch adjustable pulley.

According to another embodiment of the present disclosure, a method for manufacturing a speed-adjustable belt-disc sander is provided. The method may include providing an electric motor, providing a first pitch adjustable pulley driven by the electric motor, providing a second pitch adjustable pulley driven by the first pitch adjustable pulley, providing a v-belt connecting the first pitch adjustable pulley and the second pitch adjustable pulley, providing a first pulley driven by the second pitch adjustable pulley, providing a second pulley driven by the first pulley, providing a belt sander assembly driven by the second pulley, and providing a speed adjusting device designed to control an effective belt diameter of the second pitch adjustable pulley, thereby controlling a speed of the belt sander assembly.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
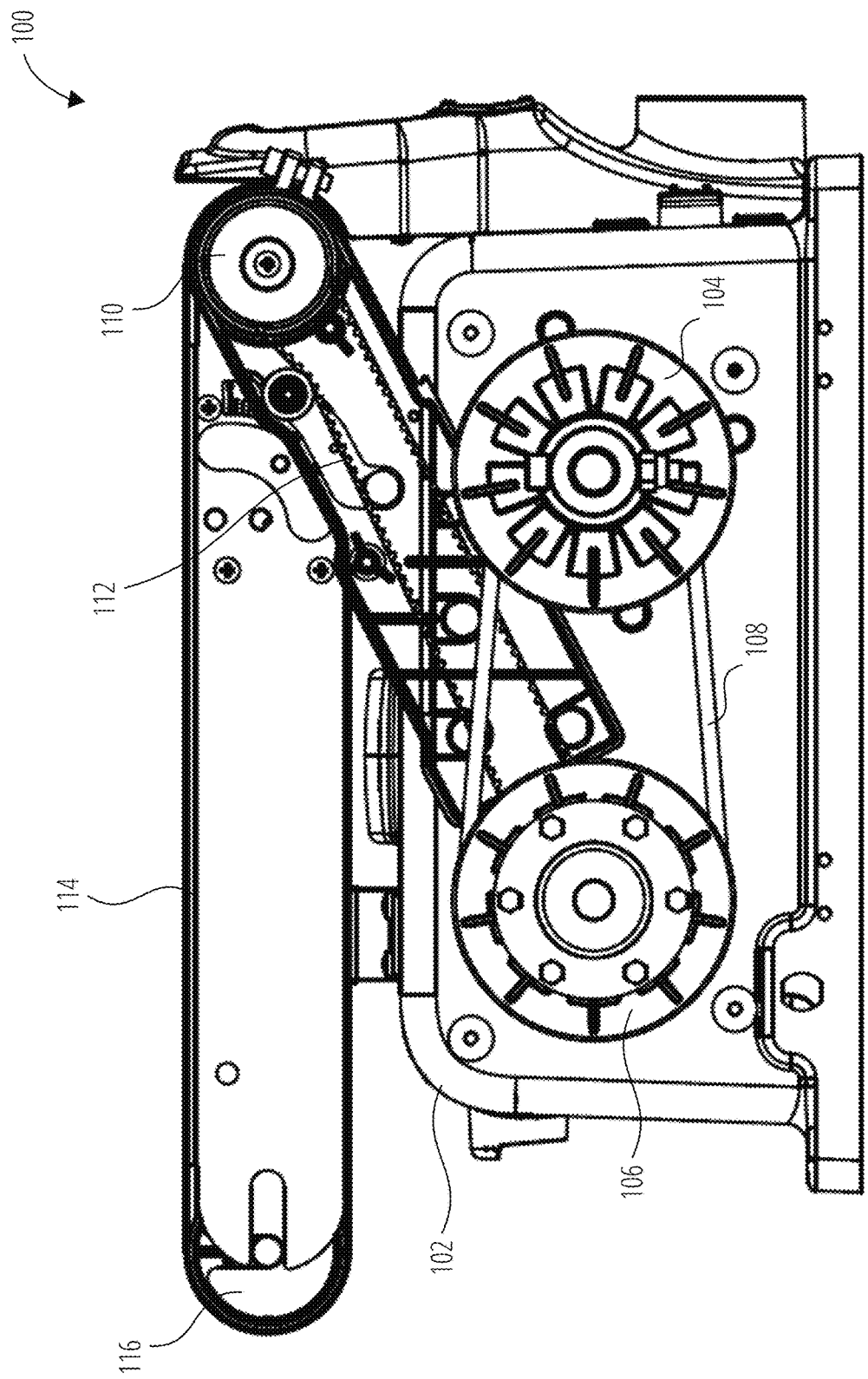
FIG. 1 is a front view of a speed-adjustable belt-disc sander, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of the present disclosure relate to speed-adjustable belt-disc sanders. A speed-adjustable belt-disc sander may include a base, an electric motor disposed inside the base, a first pitch adjustable pulley driven by the electric motor, a second pitch adjustable pulley driven by the first pitch adjustable pulley, a v-belt connecting the first pitch adjustable pulley and the second pitch adjustable pulley, a first pulley driven by the second pitch adjustable pulley, a second pulley driven by the first pulley, a belt sander assembly driven by the second pulley, and a speed adjusting device designed to control an effective belt diameter of the second pitch adjustable pulley, thereby controlling a speed of the belt sander assembly. The first pitch adjustable pulley, the second pitch adjustable pulley, the v-belt, the first pulley, and the second pulley can be located on the first side surface of the base. The speed adjusting device can be located on the second side surface of the base, the second side surface opposite the first side surface.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Figure 2:
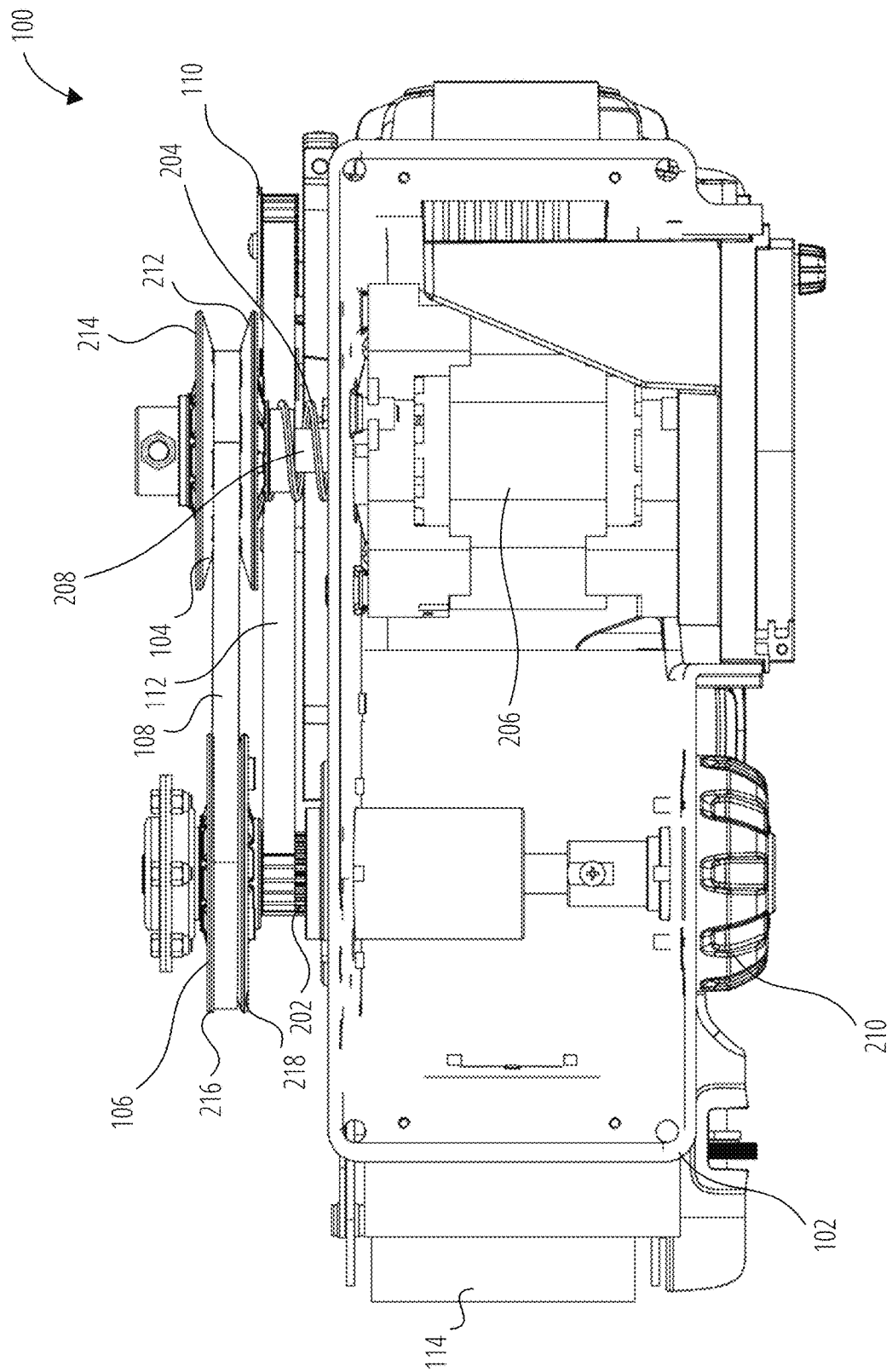
FIG. 2 is a bottom view of the speed-adjustable belt-disc sander, according to an example embodiment.
Figure 3:
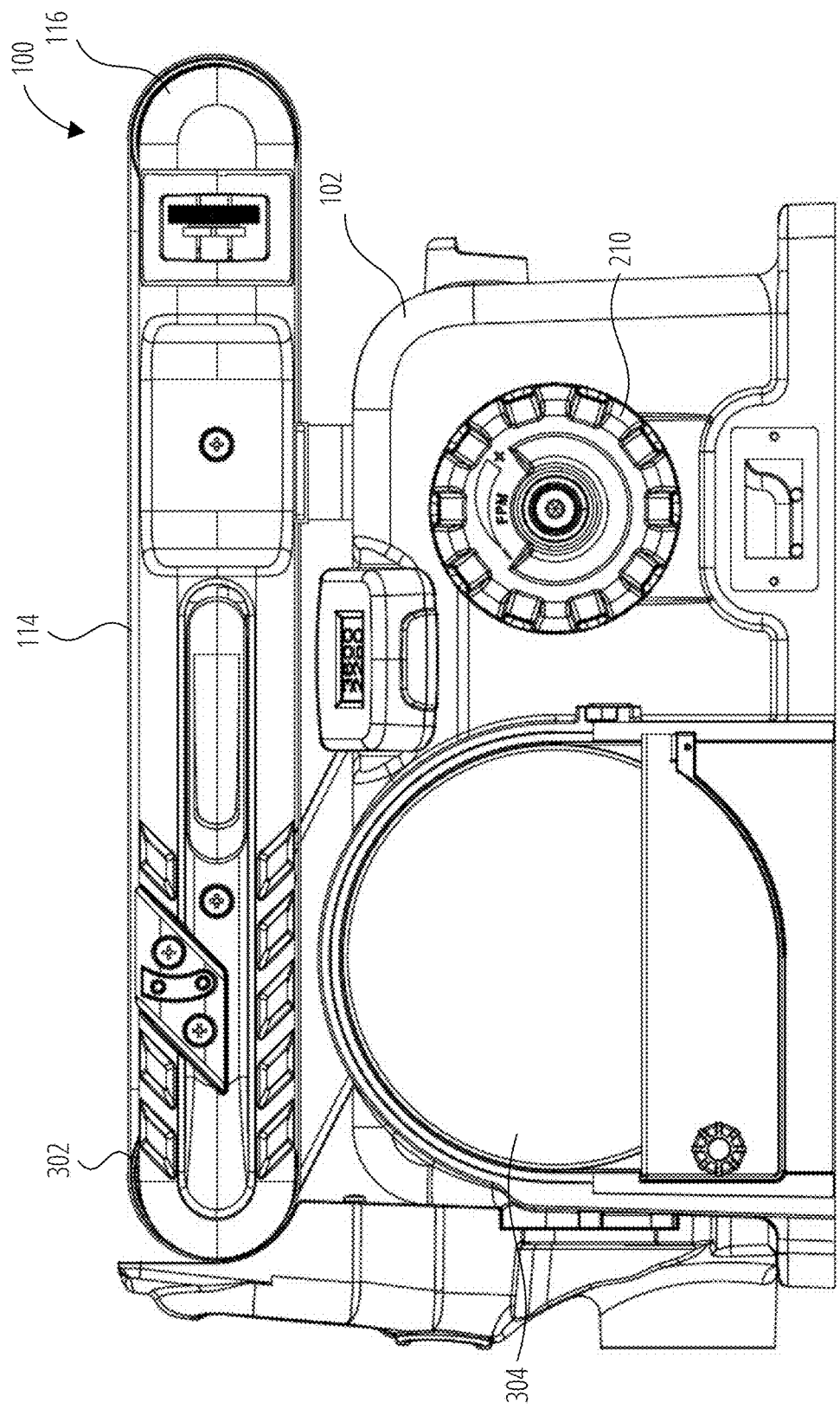
FIG. 3 is a rear view of the speed-adjustable belt-disc sander, according to an example embodiment.
Figure 4:
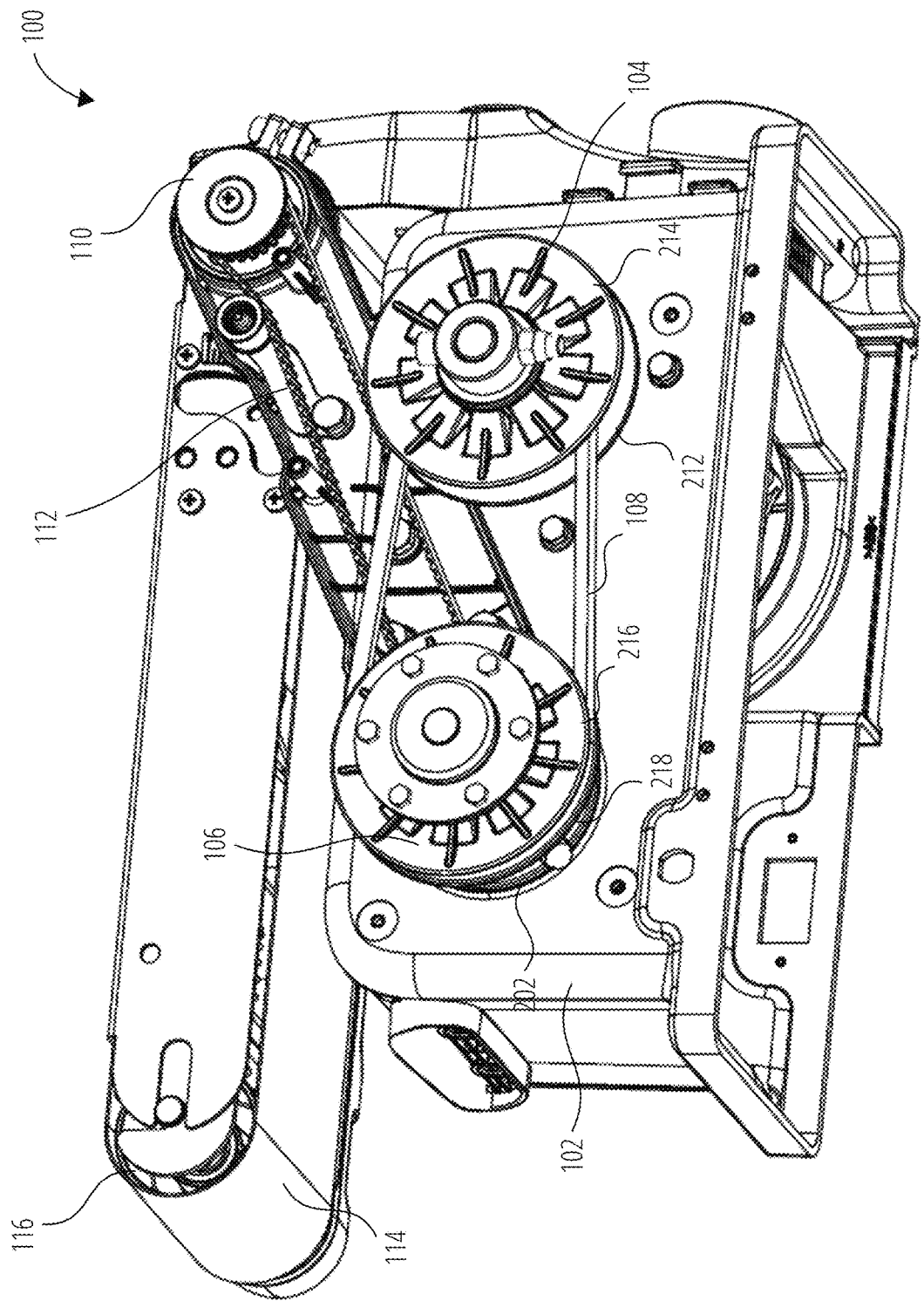
FIG. 4 is a bottom side angle view of the speed-adjustable belt-disc sander, according to an example embodiment.

FIG. 1 is a front view of a speed-adjustable belt-disc sander 100, according to an example embodiment. FIG. 2 is a bottom view of the speed-adjustable belt-disc sander 100, according to an example embodiment. FIG. 3 is a rear view of the speed-adjustable belt-disc sander, according to an example embodiment. FIG. 4 is a bottom side angle view of the speed-adjustable belt-disc sander, according to an example embodiment.

As shown in FIGS. 1-4, the speed-adjustable belt-disc sander 100 may include a base 102, a first pitch adjustable pulley 104, a second pitch adjustable pulley 106, a v-belt 108, a first pulley 202, a second pulley 110, a belt 112, a spring 204, an electric motor 206, a shaft 208 of the electric motor 206, a speed adjusting knob 210, a sanding belt 114, a pulley 116, a pulley 302, and a sanding disc 304. Sanding belt 114, pulley 116, and pulley 302 form a belt sander assembly. Sanding disc 304 can be mounted on shaft 208 of electric motor 206.

First pitch adjustable pulley 104 may include a movable flange 212 and a fixed flange 214. The position of fixed flange 214 is fixed along the axis of rotation of first pitch adjustable pulley 104. Movable flange 212 can move along the axis of rotation of first pitch adjustable pulley 104. Spring 204 may push movable flange 212 towards fixed flange 214. Movable flange 212 and fixed flange 214 form a groove for accepting v-belt 108. The space between movable flange 212 and fixed flange 214 determines the effective diameter (also referred as to an effective belt diameter) of first pitch adjustable pulley 104. The effective diameter can be equal to two distances from the center of the pulley's axis to the point where v-belt 108 contacts the pulley. The effective diameter depends on the depth at which v-belt 108 sits in the groove. As v-belt 108 moves deeper into the pulley's groove, the effective diameter decreases. When v-belt 108 sits higher, the effective diameter increases. By moving movable flange 212 towards fixed flange 214, the effective diameter increases, and by moving movable flange 212 apart from fixed flange 214, the effective diameter decreases.

Second pitch adjustable pulley 106 may include a movable flange 216 and a fixed flange 218. The position of fixed flange 218 is fixed along the axis of rotation of second pitch adjustable pulley 106. Movable flange 216 can move along the axis of rotation of second pitch adjustable pulley 106. The position of movable flange 216 can be controlled via speed adjusting knob 210 as described further in FIG. 5. Movable flange 216 and fixed flange 218 form a groove for accepting v-belt 108. The space between movable flange 216 and fixed flange 218 determines the effective belt diameter of second pitch adjustable pulley 106. By moving movable flange 216 towards fixed flange 218, the effective belt diameter increases, and by moving movable flange 216 apart from fixed flange 218, the effective belt diameter decreases.

First pulley 202 may have a fixed diameter and can be conjoined with fixed flange 218 of second pitch adjustable pulley 106. The angular speed of the rotation of first pulley 202 can be equal to the angular speed of the rotation of second pitch adjustable pulley 106. The angular speed of the rotation of second pitch adjustable pulley 106 can be controlled by adjusting the effective belt diameter of second pitch adjustable pulley 106 via speed adjusting knob 210.

Second pulley 110 may drive pulley 302 to cause sanding belt 114 to move. Second pulley 110 is driven by first pulley 202 via belt 112. In some embodiments, the first pulley 202 and second pulley 110 can be timing pulleys and belt 112 can be a timing belt. First pulley 202 is driven by second pitch adjustable pulley 106 via v-belt 108. Second pitch adjustable pulley 106 is driven by first pitch adjustable pulley 104. First pitch adjustable pulley 104, in turn, is driven by electric motor 206.

Speed of movement of sanding belt 114 can be adjusted as follows. An operator turns the speed adjusting knob 210 to cause the axial movement of movable flange 216 of second pitch adjustable pulley 106 in order to change the space between fixed flange 218 and movable flange 216. The change of the space between fixed flange 218 and movable flange 216 results in changing the effective belt diameter of second pitch adjustable pulley 106. As a result of changing the effective belt diameter, the diameter of the contact area between the driven combined pulley and the v-belt 108 changes. However, the length of the v-belt 108 remains constant. Therefore, either v-belt 108 or spring 204 forces movable flange 212 of first pitch adjustable pulley 104 to move along shaft 208 of electric motor 206. As a result, the diameter ratio between first pitch adjustable pulley 104 and second pitch adjustable pulley 106 changes, thereby increasing or decreasing the rotation speed of first pulley 202, second pulley 110, and pulley 116 of belt sander assembly.

Figure 5:
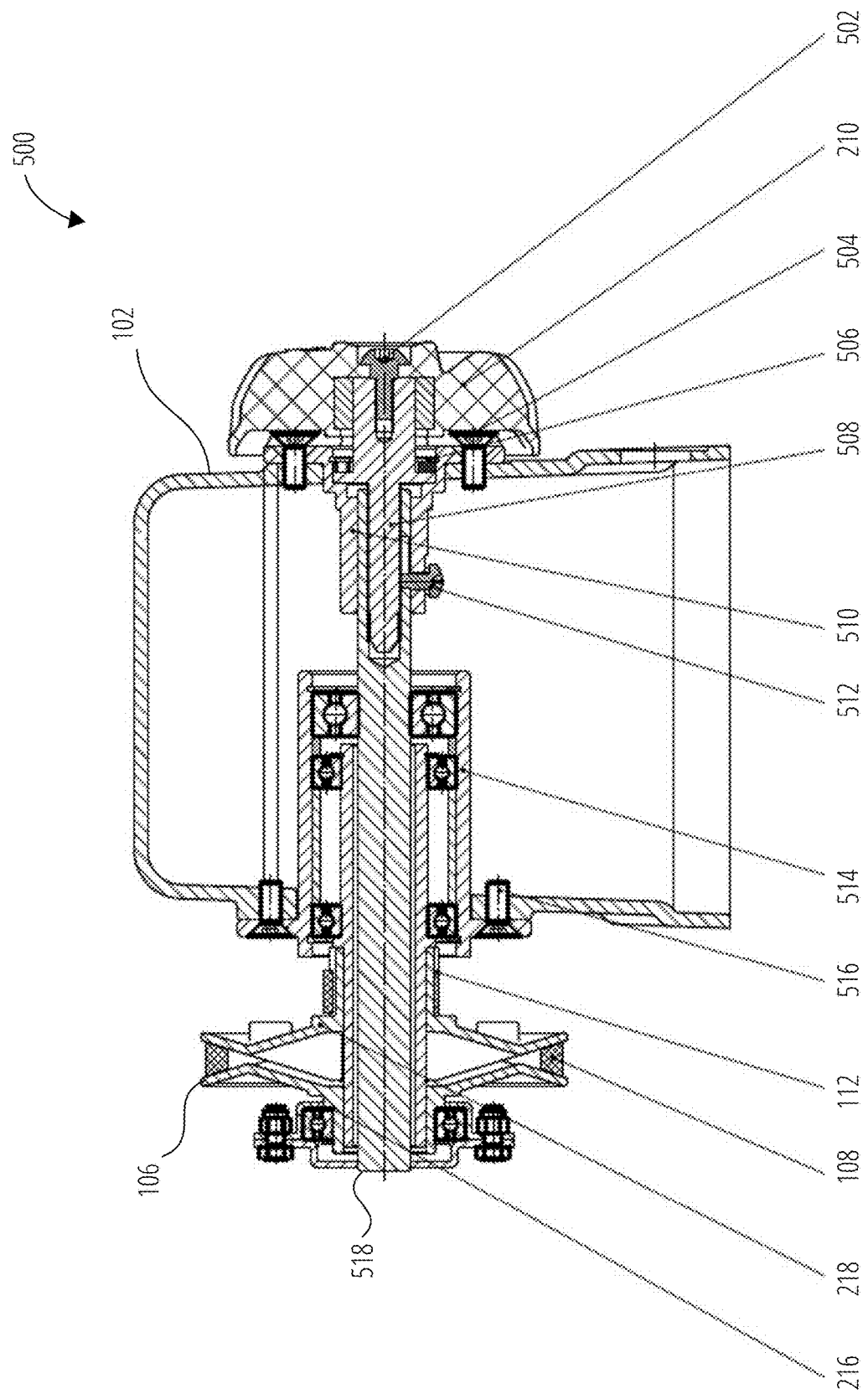
FIG. 5 is a cross-section view of the speed-adjustable belt-disc sander, according to an example embodiment.

FIG. 5 is a cross-section view 500 of speed-adjustable belt-disc sander 100, according to an example embodiment. As shown in FIG. 5, speed-adjustable belt-disc sander 100 includes a v-belt 108, a belt 112, a speed adjusting knob 210, a movable flange 216, a fixed flange 218, a knob mount screw 502, a countersunk screw 504, a circlip 506, a drive threaded rod 508, a drive threaded rod bushing 510, a setscrew 512, a support bushing 514, a countersunk screw 516, and a shaft 518.

Drive threaded rod bushing 510 can be secured on the base 102 with countersunk screws 504. Drive threaded rod 508 can be placed inside shaft 518 and secured with circlips 506. Shaft 518 can be rigidly attached to movable flange 216 of second pitch adjustable pulley 106. Shaft 518 may have internal threads engaging the external threads of drive threaded rod 508. Shaft 518 may also have a slot for inserting the head of the setscrew 512 to limit the rotation of shaft 518. As a result, shaft 518 is allowed solely to move along the axis of rotation of second pitch adjustable pulley 106. Speed adjusting knob 210 can be secured on the drive threaded rod 508 with the knob mount screw 502. The rotation of speed adjusting knob 210 can cause the rotation of drive threaded rod 508. The rotation of drive threaded rod 508 can cause the axial movement of shaft 518. The axial movement of shaft 518 can cause movement of movable flange 212, thereby modifying the space between fixed flange 218 and movable flange 216 in order to adjust the effective belt diameter of second pitch adjustable pulley 106. In other embodiments, different speed adjusting devices can be used instead of speed adjusting knob 210. For example, the different speed adjusting devices may include linkage rods, lever mechanisms, and the like.

Figure 6:
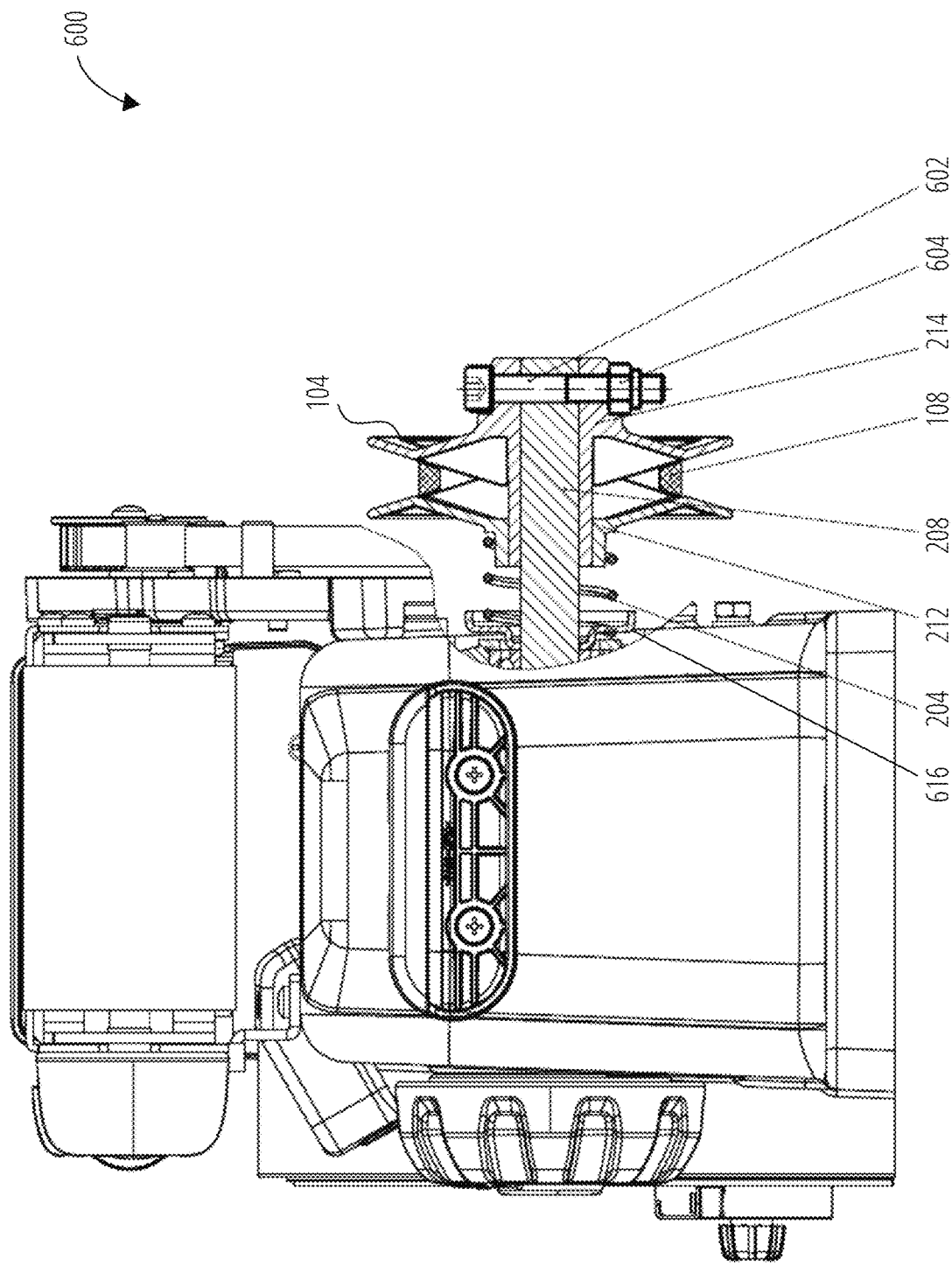
FIG. 6 is a partial cross-section view of the speed-adjustable belt-disc sander, according to an example embodiment.

FIG. 6 is a partial cross-section view 600 of speed-adjustable belt-disc sander 100, according to an example embodiment. As shown in FIG. 6, speed-adjustable belt-disc sander 100 includes a first pitch adjustable pulley 104, a v-belt 108, a spring 204, a shaft 208, a movable flange 212, a fixed flange 214, a bolt 602, a nut 604, and a spring support base 616.

Fixed flange 214 can be secured on shaft 208 of electric motor 206 (shown in FIG. 2) with bolt 602 and nut 604. Spring 204 can be placed around shaft 208 between the spring support base 616 and movable flange 212 to push movable flange 212 toward fixed flange 214. When movable flange 212 moves toward fixed flange 214, v-belt 108 becomes locked between fixed flange 214 and movable flange 212 at the current effective belt diameter of first pitch adjustable pulley 104. When the effective belt diameter of second pitch adjustable pulley 106 (shown in FIG. 2) changes, spring 204 is compressed or released to adjust the space between movable flange 212 and fixed flange 214, thereby changing effective belt diameter of first pitch adjustable pulley 104.

Figure 7:
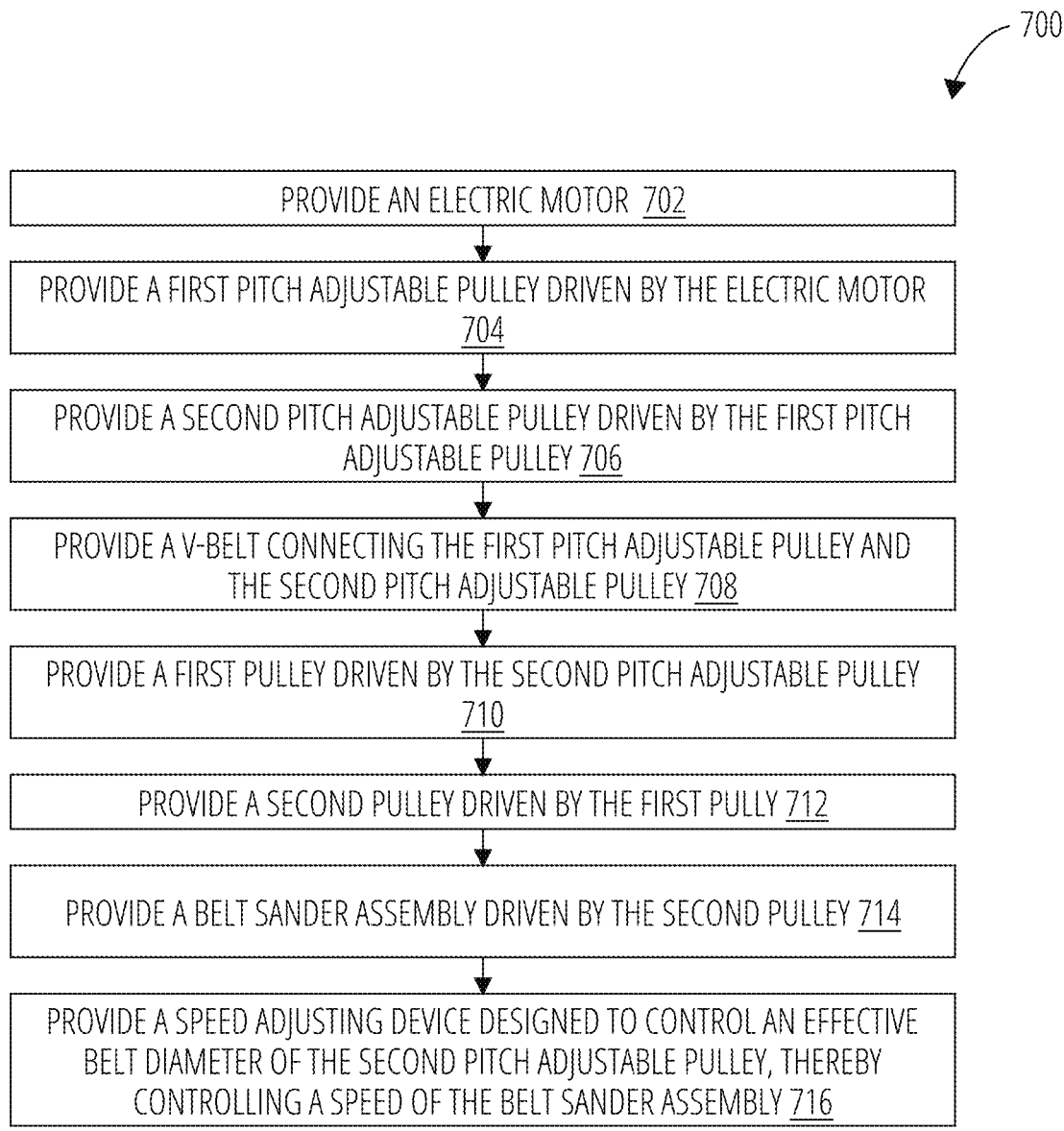
FIG. 7 illustrates a method for manufacturing a speed-adjustable belt-disc sander in accordance with one embodiment.

FIG. 7 illustrates a method for manufacturing a speed-adjustable belt-disc sander in accordance with one example embodiment. In other example embodiments, the operations of method 700 may be combined, performed in parallel, or performed in a different order. Method 700 may also include additional or fewer operations than those illustrated.

In block 702, method 700 may include providing an electric motor. The speed-adjustable belt-disc sander may include a base. The electric motor can be disposed inside the base.

In block 704, method 700 may include providing a first pitch adjustable pulley driven by the electric motor. The first pitch adjustable pulley can be coaxial with a shaft of the electric motor.

In block 706, method 700 may include providing a second pitch adjustable pulley driven by the first pitch adjustable pulley. In block 708, method 700 may include providing a v-belt connecting the first pitch adjustable pulley and the second pitch adjustable pulley. In block 710, method 700 may include providing a first pulley driven by the second pitch adjustable pulley. The first pulley can be coaxial with the second pitch adjustable pulley.

In block 712, method 700 may include providing a second pulley driven by the first pulley. In block 714, method 700 may include providing a belt sander assembly driven by the second pulley. In block 716, method 700 may include providing a speed adjusting device designed to control an effective belt diameter of the second pitch adjustable pulley, thereby controlling a speed of the belt sander assembly. The speed adjusting device may include a knob.

The base of speed-adjustable belt-disc sander may include a top surface, a first side surface, and a second side surface opposite to the first side surface. The first pulley, the second pulley, the first pitch adjustable pulley, and the second pitch adjustable pulley can be disposed on the first side surface. The speed adjusting device can be disposed on the second side surface.

The speed-adjustable belt-disc sander may include a shaft designed to move a flange of the second pitch adjustable pulley, thereby adjusting the effective belt diameter of the second pitch adjustable pulley, with the shaft including internal threads. The speed-adjustable belt-disc sander can include a rod rotationally coupled with the speed adjusting device, the rod including external threads engaged with the internal threads of the shaft. When the rod is rotated by the speed adjusting device, the shaft is prevented from rotation around a rotational axis of the second pitch adjustable pulley and allowed to move along the rotational axis to move the flange. The speed-adjustable belt-disc sander may include a screw. The shaft designed to move the flange of the second pitch adjustable pulley may have a slot and the screw can be inserted into the slot to prevent the shaft from rotating around the rotational axis of the second pitch adjustable pulley.

The speed-adjustable belt-disc sander may include a spring disposed around a shaft of the electric motor. The first pitch adjustable pulley may include a first flange and a second flange forming a groove for accepting the v-belt. The spring can be designed to squeeze the v-belt between the first flange and the second flange and to push the first flange into the second flange, thereby adjusting a further effective belt diameter of the first pitch adjustable pulley in response to adjusting the effective belt diameter of the second pitch adjustable pulley.

Thus, a speed-adjustable belt-disc sander and method for manufacturing a speed-adjustable belt-disc sander have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:
1. A speed-adjustable belt-disc sander comprising:
a belt sander assembly including a sanding belt, a first assembly pulley, and a second assembly pulley;
an electric motor;
a first pitch adjustable pulley mounted on a motor shaft of the electric motor;
a second pitch adjustable pulley mounted on a first shaft different from the motor shaft and a second shaft of the first assembly pulley, the second pitch adjustable pulley being driven by the first pitch adjustable pulley via a v-belt connecting the first pitch adjustable pulley and the second pitch adjustable pulley;
a first pulley coaxial with and fixed to a fixed flange of the second pitch adjustable pulley on the first shaft;
a second pulley coaxially mounted to the first assembly pulley and connected to the first pulley through a belt; and a speed adjusting device designed to control an effective belt diameter of the second pitch adjustable pulley, thereby controlling a speed of the belt sander assembly.

2. The speed-adjustable belt-disc sander of claim 1, wherein the first pulley and the second pulley are connected by a belt.

3. The speed-adjustable belt-disc sander of claim 1, further comprising a base including a top surface, a first side surface, and a second side surface opposite to the first side surface, wherein:
the electric motor is disposed inside the base;
the first pulley, the second pulley, the first pitch adjustable pulley, and the second pitch adjustable pulley are disposed on the first side surface; and
the speed adjusting device is disposed on the second side surface.

4. The speed-adjustable belt-disc sander of claim 1, wherein the first pitch adjustable pulley is coaxial with a shaft of the electric motor.

5. The speed-adjustable belt-disc sander of claim 1, wherein the first pulley is coaxial with the second pitch adjustable pulley.

6. The speed-adjustable belt-disc sander of claim 1, further comprising:
a shaft designed to move a flange of the second pitch adjustable pulley, thereby adjusting the effective belt diameter of the second pitch adjustable pulley, the shaft including internal threads; and
a rod rotationally coupled with the speed adjusting device, the rod including external threads engaged with the internal threads of the shaft; and
wherein when the rod is rotated by the speed adjusting device, the shaft being prevented from rotation around a rotational axis of the second pitch adjustable pulley and allowed to move along the rotational axis to move the flange.

7. The speed-adjustable belt-disc sander of claim 6, further comprising a screw, wherein:
the shaft has a slot; and
the screw is inserted into the slot to prevent the shaft from rotating around the rotational axis of the second pitch adjustable pulley.

8. The speed-adjustable belt-disc sander of claim 1, further comprising a spring, wherein:
the first pitch adjustable pulley includes a first flange and a second flange forming a groove for accepting the v-belt; and
the spring is designed to squeeze the v-belt between the first flange and the second flange.

9. The speed-adjustable belt-disc sander of claim 8, wherein the spring is designed to push the first flange into the second flange, thereby adjusting a further effective belt diameter of the first pitch adjustable pulley in response to adjusting the effective belt diameter of the second pitch adjustable pulley.

10. The speed-adjustable belt-disc sander of claim 8, wherein the spring is disposed around a shaft of the electric motor.

11. A method for manufacturing a speed-adjustable belt-disc sander, the method comprising:
providing a belt sander assembly including a sanding belt, a first assembly pulley, and a second assembly pulley;
providing an electric motor;
providing a first pitch adjustable pulley mounted on a motor shaft of the electric motor;
providing a second pitch adjustable pulley mounted on a first shaft different from the motor shaft and a second shaft of the first assembly pulley, the second pitch adjustable pulley being driven by the first pitch adjustable pulley via a v-belt connecting the first pitch adjustable pulley and the second pitch adjustable pulley;
providing a first pulley coaxial with and fixed to a fixed flange of the second pitch adjustable pulley on the first shaft;
providing a second pulley coaxially mounted to the first assembly pulley and connected to the first pulley through a belt; and
providing a speed adjusting device designed to control an effective belt diameter of the second pitch adjustable pulley, thereby controlling a speed of the belt sander assembly.

12. The method of claim 11, wherein the first pulley and the second pulley are connected by a belt.

13. The method of claim 11, further comprising providing a base including a top surface, a first side surface, and a second side surface opposite to the first side surface, wherein:
the electric motor is disposed inside the base;
the first pulley, the second pulley, the first pitch adjustable pulley, and the second pitch adjustable pulley are disposed on the first side surface; and
the speed adjusting device is disposed on the second side surface.

14. The method of claim 11, wherein the first pitch adjustable pulley is coaxial with a shaft of the electric motor.

15. The method of claim 11, wherein the first pulley is coaxial with the second pitch adjustable pulley.

16. The method of claim 11, further comprising:
providing a shaft designed to move a flange of the second pitch adjustable pulley, thereby adjusting the effective belt diameter of the second pitch adjustable pulley, the shaft including internal threads; and
providing a rod rotationally coupled with the speed adjusting device, the rod including external threads engaged with the internal threads of the shaft, and wherein when the rod is rotated by the speed adjusting device, the shaft being prevented from rotation around a rotational axis of the second pitch adjustable pulley and allowed to move along the rotational axis to move the flange.

17. The method of claim 16, further comprising providing a screw, wherein:
the shaft has a slot; and
the screw is inserted into the slot to prevent the shaft from rotating around the rotational axis of the second pitch adjustable pulley.

18. The method of claim 11, further comprising providing a spring, wherein:
the first pitch adjustable pulley includes a first flange and a second flange forming a groove for accepting the v-belt; and
the spring is designed to squeeze the v-belt between the first flange and the second flange.

19. The method of claim 18, wherein the spring is designed to push the first flange into the second flange, thereby adjusting a further effective belt diameter of the first pitch adjustable pulley in response to adjusting the effective belt diameter of the second pitch adjustable pulley.

20. The method of claim 18, wherein the spring is disposed around a shaft of the electric motor.

* * * * *